United States Patent [19]
Oota et al.

[11] Patent Number: 5,580,477
[45] Date of Patent: Dec. 3, 1996

[54] ELECTRIC POWER SUPPLY FOR A HEATER HEATING A CATALYST FOR PURIFYING AUTOMOTIVE EXHAUST GASES

[75] Inventors: Nobuyuki Oota, Kariya; Motonobu Akaki, Anjo; Hiroshi Okazaki, Kariya; Teruo Tatsumi, Anjo; Yasutoshi Yamada, Chita-gun, all of Japan

[73] Assignee: Aisin Seiki Kabushiki Kaisha, Kariya, Japan

[21] Appl. No.: 263,426

[22] Filed: Jun. 21, 1994

[30] Foreign Application Priority Data

Jun. 22, 1993 [JP] Japan ..................... 5-150377

[51] Int. Cl.[6] ..................... H05B 1/02
[52] U.S. Cl. ............ 219/494; 219/202; 219/206; 219/485; 219/508; 307/10.1; 307/10.6
[58] Field of Search ............ 219/202–206, 219/494, 497, 501, 511, 505, 508, 481, 488, 485; 307/10.1, 10.6, 10.7, 9.1, 42–48; 322/1, 33

[56] References Cited

U.S. PATENT DOCUMENTS

| | | | |
|---|---|---|---|
| 4,651,020 | 3/1987 | Kenny et al. | 307/43 |
| 5,319,929 | 6/1994 | Cornelison et al. | 60/274 |
| 5,321,231 | 6/1994 | Schmalzriedt et al. | 219/497 |

FOREIGN PATENT DOCUMENTS

| | | |
|---|---|---|
| 0533037 | 3/1993 | European Pat. Off. . |
| 3805256 | 8/1989 | Germany . |
| 48-54312 | 7/1973 | Japan . |
| 4-276111 | 10/1992 | Japan . |

*Primary Examiner*—Mark H. Paschall
*Attorney, Agent, or Firm*—Oblon, Spivak, McClelland, Maier & Neustadt, P.C.

[57] ABSTRACT

An electric power supply for a heater includes a heater, a battery electrically connected with the heater, a booster circuit electrically connected with the battery, a condenser disposed between the heater and the booster circuit and control element which controls a charge and a discharge of the condenser.

9 Claims, 2 Drawing Sheets

ELECTRIC POWER SUPPLY FOR A HEATER HEATING A CATALYST FOR PURIFYING AUTOMOTIVE EXHAUST GASES

BACKGROUND OF THE INVENTION

1. Field of the Invention

This invention relates to an electric power supply for a heater, in particular relates to an electric power supply for a heater heating a catalyst for the use of purifying exhaust gas from an internal combustion engine of the vehicle.

2. Description of the Related Art

Catalyst for the use of purifying exhaust gas from an internal combustion engine is not usually activated under a predetermined value of temperature so as not to be able to purify the exhaust gas. In particular, the catalyst without the heater is heated by heat of the exhaust gas. Therefore, since the exhaust gas is low temperature and the inner portion of the internal combustion engine is not heated when the internal combustion engine is started, the catalyst can not sufficiently purify the exhaust gas.

A conventional catalytic device which comprises a heater coated with the catalyst is disclosed in the Japanese Patent Laid Open No. 48 (1973)-54312. In accordance with the catalytic device disclosed in the prior art ingredients not burned in the exhaust gas are evaporated by the heater when the engine is started.

However, according to the catalytic device because a large amount of the rush current (which will be described "electric current" hereinafter) is flowed from a battery activating the heater when the heater is heated, the battery has a short life. Further, the battery has to include a large capacity.

A conventional electric power supply for a heater heating a catalyst is disclosed in the Japanese Patent Laid Open No. 4 (1992)-276111. The electric power supply in the prior art comprises a charged condenser used for the power supply to the heater. The charged condenser is charged up to the same voltage of the battery by the battery directly. Therefore, the electric current is not flowed from the battery activating the heater when the heater is heated. Further, early in the activation of the heater the condenser can flow a large electric current into the heater relative to the battery. Consequently, the electric power supply can rapidly heat the catalyst.

However in accordance with the prior art, since the heater is heated by the voltage of the battery, a large amount of the electric current has to be flowed into the heater so as to heat the catalyst when the condenser is charged by the battery. Therefore, the voltage applied to the heater is decreased through a cable and switches and so on. Furthermore, the electric power supply has to be large in size, heavy in weight and high in cost.

In case of the electric power supply including two heaters each of heating two catalysts provided to be in parallel each other so as to be arranged with the exhaust passage, a large amount of electric current is flowed into the heaters from the battery because of the low resistance of the heaters. Therefore, the cable and the switches are required to be used for a large electric current exclusively.

SUMMARY OF THE PRESENT INVENTION

It is an object of the present invention to provide an electric power supply for a heater which can prevent a large amount of electric current flowed into a heater.

It is another object of the present invention to provide an electric power supply for a heater which can rapidly heat a catalyst.

It is a further object of the present invention to provide an electric power supply for a heater which can easily heat two catalysts.

It is a further object of the present invention to provide an electric power supply for a heater which is simple in structure and small in size.

It is a further object of the present invention to provide an electric power supply for a heater which is low in cost.

It is a further object of the present invention to provide an electric power supply for a heater which is convenient to be manufactured.

It is a further object of the present invention to provide an electric power supply for a heater which exhibits durability.

To achieve the above mentioned objects, an electric power supply for a heater in accordance with this invention comprises a heater, a battery electrically connected with the heater, a booster circuit electrically connected with the battery, a condenser disposed between the heater and the booster circuit and control means which control a charge and a discharge of the condenser.

BRIEF DESCRIPTION OF THE DRAWINGS

The features and advantages of the electric power supply for a heater according to the present invention will be more clearly appreciated from the following description in conjunction with the accompanying drawings wherein.

DETAILED DESCRIPTION OF PREFERRED EMBODIMENTS OF THE INVENTION

Figure 1:
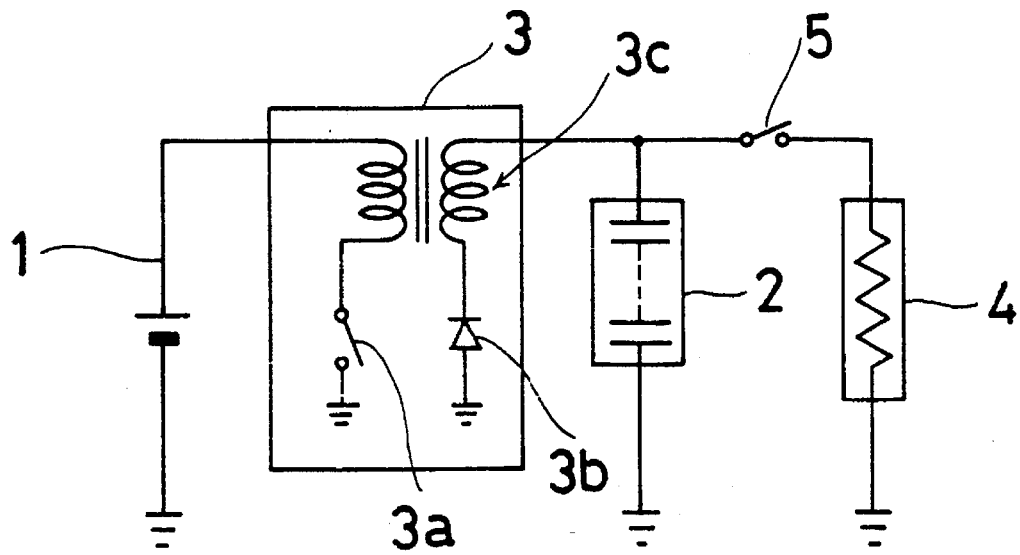
FIG. 1 is a circuit diagram of a first embodiment of an electric power supply for a heater in accordance with the present invention.

A first embodiment of an electric power supply for a heater in accordance with the present invention is disclosed in the FIG. 1. Referring to the FIG. 1, a battery i is used for supplying electric power to a starter of an internal combustion engine (not shown in the FIGURES) when the engine is started. Further, a condenser 2 which includes a plurality of condenser elements is charged by the battery 1. The condenser 2 is used for a power resource of heating a heater 4 with a catalyst. A DC-DC converter 3 which is used for a booster circuit comprises a charge control switch 3a, diode 3b and a transformer 3c. The transformer 3c transforms a voltage of the battery 1 into 120 volt. The condenser 2 is charged by the transformed voltage. A switch 5 controls a discharge of the condenser 2. The switch 5 is provided to be closed for a predetermined period when the internal combustion engine is started. In the embodiment the battery 1 of 12 volt, the condensers 2 of 3.0 farad and the heater 4 of 4.5 ohm are used. The catalyst needs an electric power from 15 to 40 kilojoule relative to a size of the catalyst to be heated. As shown in the FIG. 1, the condenser elements of the condenser 2 are arranged in series each other so as to be able to resist the high voltage transformed by the DC-DC converter 3.

An operation of the first embodiment of the electric power supply will be described hereinafter. At first, before the engine is started, the condenser 2 is charged by the voltage of 120 volt transformed of the voltage of 12 volt of the battery 1. When the engine is started, the switch 5 is closed and the heater 4 is heated by the electric current flowed from the condenser 2.

A quantity of the electric current flowed into the heater 4 (In accordance with the embodiment of the invention, the electric current of 30 ampere is flowed into the heater 4.) is rather smaller than that of the conventional electric power supply (In the conventional electric power supply, the electric current of 150 ampere is flowed into the heater.) because the electric resistance of the heater 4 (In accordance with the embodiment of the invention, the electric resistance of the heater 4 is 4.5 ohm.) is extremely large in relation to that of the conventional electric power supply (In the conventional electric power supply, the electric resistance of the heater is 70 milliohm.).

In accordance with the first embodiment, the switch 5 is closed when the internal combustion engine is started. However, the switch 5 does not have to be closed according to the start of the engine. For example the switch 5 may be closed when the an ignition key is inserted into a key cylinder. And the close operation of the switch 5 may be connected with an open and a close operations of a vehicle door. Further the switch 5 may be closed when an increase of a voltage of the down stream of an ignition switch in a circuit is detected. However, when the switch 5 is closed after the start of the engine, the catalyst is begun to be heated late and the exhaust gas insufficiently purified. Therefore, the catalyst had better be heated by anticipation of the engine start before the engine is started.

In the above embodiment, the heater 4 can be heated by the high voltage because of the DC-DC converter 3. Therefore the electric current flowed into the heater 4 can be small by the high voltage supplied to the heater 4 and the large resistance of the heater 4 since the electric power which the heater 4 needs to be heated is constant. Consequently, the voltage is not decreased through a cable and switches in the circuit. Further, the electric power supply can be small in size, light in weight and low in cost. Furthermore, because the condenser 2 is used for heating the heater 4 instead of the battery 1, the battery 1 can be eased the burden. And the condenser 2 supplies the electric power to the heater 4 more rapidly than the battery 1.

Figure 2:
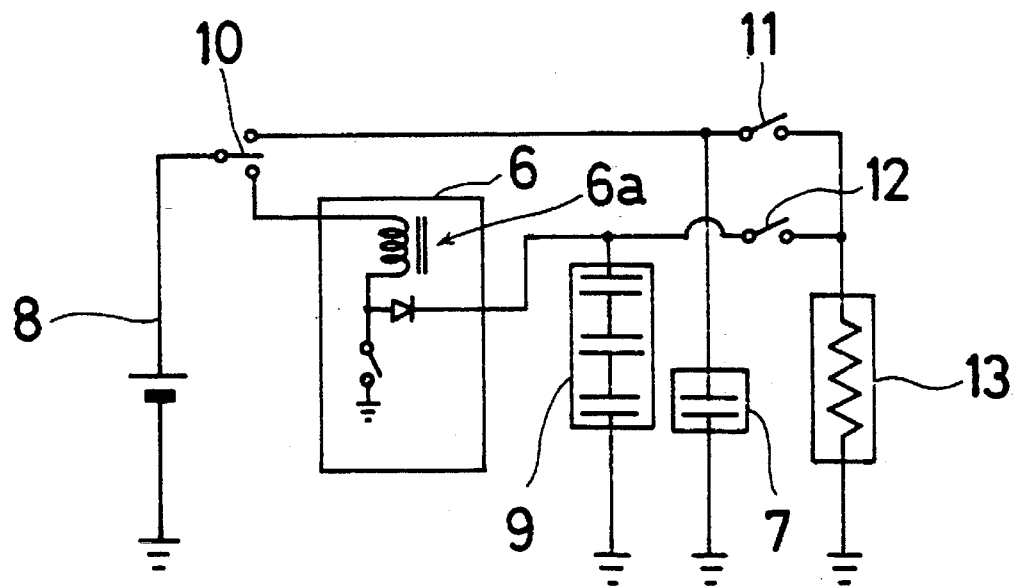
FIG. 2 is a circuit diagram of a second embodiment of an electric power supply for a heater in accordance with the present invention.

A second embodiment of the electric power supply for a heater is disclosed in the FIG. 2. The electric power supply comprises a DC-DC converter 6 as a booster circuit including an inducter 6a. A voltage of a battery 8 is directly supplied to a condenser 7. On the other hand, a voltage of 40 volt which is formed to be transformed of the voltage of the battery 8 by the DC-DC converter 6 is supplied to a condenser 9 which includes a plurality of condenser elements. In the embodiment, the condenser 7 of 100 farad and the condenser 9 of 30 farad are used. A switch 10 is selectively switched into one of a first position for charging the condenser 7 and a second position for charging the condenser 9. Each of switches 11 and 12 is closed so as to heat a heater 13 by the condensers 7 and 9 respectively. In accordance with the embodiment, the switch 11 is switched to be closed when the engine is started. The switch 11 is opened when a predetermined time is passed after the switch 11 is closed. On the other hand, the switch 12 is closed after the switch 11 is closed. Later, the switch 12 is switched to be opened after the heater 13 is sufficiently heated by the discharges of the condensers 7 and 9.

An operation of the second embodiment will be described hereinafter. At first, before the engine is started, each of the condensers 7 and 9 is charged by the selective operation of the switch 10. When the engine is started, the switch 11 is closed and the heater 13 with the catalyst is heated by the electric current flowed from the condenser 7. In accordance with the conventional electric power supply disclosed in the Japanese Patent Laid Open No. 4 (1992)-276111 in which the condenser is directly connected with the battery, an electric current of 150 ampere is flowed into the heater which has an electric resistance of 70 milliohm. However in accordance with the embodiment, because the heater 13 has the electric resistance of 450 milliohm, the electric current of 30 ampere is flowed into the heater 13.

Later on, the switch 11 is opened and the switch 12 is closed. Therefore, the heater 13 can be continued to be heated by the electric current flowed from the condenser 9 which is charged by the voltage formed to be transformed of the voltage of the battery 8 by the DC-DC converter 6. In the operation, since the heater is already rather heated by the discharge of the condenser 7, the electric resistance of the heater 13 is sufficiently large. Therefore, the electric current flowed into the heater 13 from the condenser 9 is not large.

In the above structure, since the condensers 7 and 9 are selectively switched to be applied to the heater 4, the rush current can be small when the catalyst is not heated. Therefore, the decreased voltage through the cable and switches can be further small.

Figure 3:
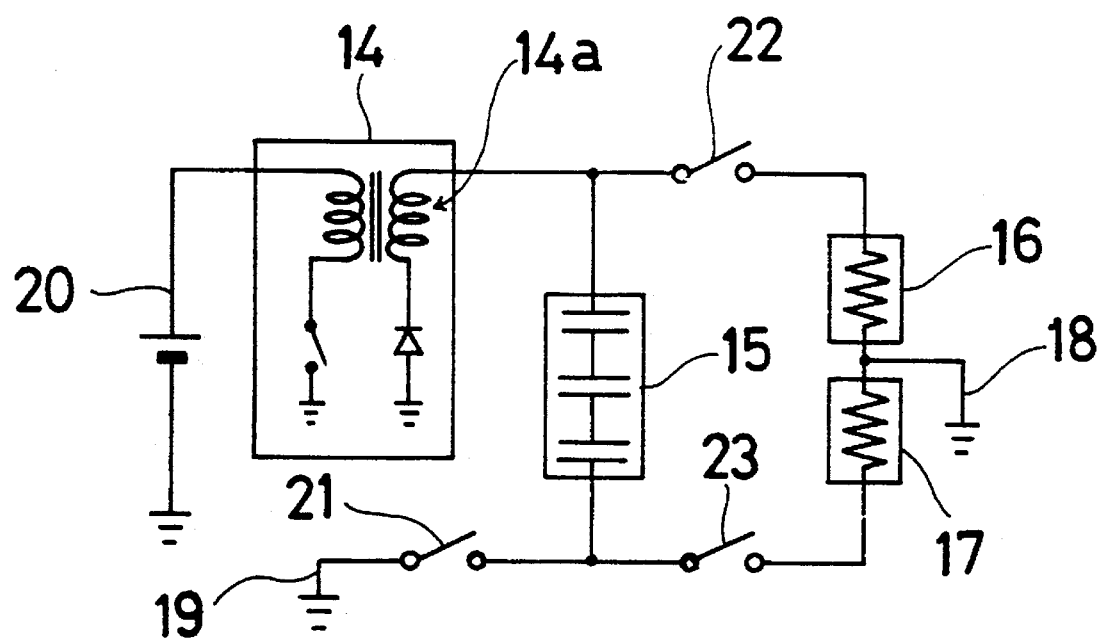
FIG. 3 is a circuit diagram of a third embodiment of an electric power supply for a heater in accordance with the present invention.

A third embodiment of the electric power supply for a heater in accordance with the invention disclosed in the FIG. 3. When the vehicle, for example, having a large displacement volume comprises two exhaust passages each of which is disposed at a right hand and a left hand of the vehicle, each of the exhaust passages includes a catalyst. Therefore, the vehicle has to comprise two heaters. The third embodiment can be corresponding to the vehicle above mentioned. As shown in the FIG. 3, since a circuit portion between heaters 16 and 17 is grounded, a piece of cable for ground of the heaters 16 and 17 can be omitted. The above structure of the heaters 16 and 17 is conventional. Therefore the third embodiment can be applied to the conventional electric power supply having two heaters.

The electric power supply of the embodiment comprises a DC-DC converter 14 as a booster which includes a transformer 14a. A condenser 15 has a capacitance of 30 farad. Each of the heaters 16 and 17 has an electric resistance of 140 milliohm, which are composed into a resistance of 70 milliohm when the heaters 16 and 17 are arranged in parallel. A ground 18 used for discharging the condenser 15 is disposed between the heaters 16 and 17. A ground 19 used for charging the condenser 15 is disposed at a negative side of the condenser 15. A switch 21 is disposed between the ground 19 and the condenser 15.

An operation of the third embodiment will be described hereinafter. At first, before the engine is started, the condenser 15 is charged by the voltage of 40 volt transformed of the voltage of 12 volt of the battery 20 by the DC-DC converter 14. In the operation the switch 21 is closed. When the engine is started, both the switches 22 and 23 are closed and the switch 21 is opened. Therefore, the heaters 16 and 17 are heated by the electric current flowed from the condensers 15. The electric current of 120 ampere is flowed into the heaters 16 and 17 Which are arranged in series. On the other hand the electric current of 480 ampere is flowed into the heaters 16 and 17 when the heaters 16 and 17 are arranged in parallel. Consequently, the electric current flowed into the heaters 16 and 17 when the heaters 16 and 17 are arranged in series is smaller than the electric current when the heaters 16 and 17 are arranged in parallel.

In the above structure, since the whole resistance of the heaters 16 and 17 arranged in series is larger than that of the resistance of the heaters 16 and 17 arranged in parallel, a quantity of the electric current flowed into the heaters 16 and 17 can be small. Therefore, the decreased voltage through the cable and switches can be small.

Further, the above structure can be applied to the conventional two heaters having a ground which is connected the circuit portion between the heaters.

While the invention has been particularly shown and described with reference to preferred embodiment thereof, it will be understood by those skilled in the art that the foregoing and other changes in form and details can be made therein without departing from the spirit and scope of the invention.

What is claimed is:

1. An electric power supply for a heater, comprising:

a battery electrically connected with the heater;

a booster circuit electrically connected between the battery and the heater in parallel;

a condenser connected with an output side of the booster circuit;

an auxiliary condenser connected with the heater;

first switching means selectively switched between a first position in which the auxiliary condenser is connected with the battery and is disconnected from the heater and a second position in which the auxiliary condenser is disconnected from the battery and is connected with the heater; and second switching means selectively switched between a first position in which the condenser is connected with the battery through the booster circuit and is disconnected from the heater and a second position in which the condenser is disconnected from the battery and is connected with the heater.

2. An electric power supply as recited in claim 1 wherein:

the first switching means includes a first switch which selectively connects the battery with one of an input side of the booster circuit and the auxiliary condenser and a second switch which connects and disconnects the auxiliary condenser with the heater, and the second switching means includes the first switch and a third switch which connects and disconnects the condenser with the heater.

3. An electric power supply as recited in claim 2, wherein the second switch is opened a predetermined time after the second switch is closed, and the third switch is closed after the second switch is opened.

4. An electric power supply as recited in claim 3, wherein the first switch is connected with the heater by a first cable in which the second switch is interposed, the first switch is connected with the heater in parallel with the first cable by a second cable in which the booster circuit and the third switch are interposed, and the first switch selectively connects the battery with the first cable and the second cable.

5. An electric power supply as recited in claim 4, wherein the auxiliary condenser is connected with a part of the first cable which is located between the first and second switches and the condenser is connected with a part of the second cable between an output side of the booster circuit and the heater.

6. An electric power supply for a heater, comprising:

an auxiliary heater connected with the heater in series each other, wherein the connecting point between one end of the heater and one end of the auxiliary heater is connected to the ground;

a battery electrically connected with the other end of the heater;

a booster circuit electrically connected between the other end of the heater and the battery;

a condenser connected between the other end of the heater and an output side of the booster circuit at its one end and connected with the other end of the auxiliary heater and ground at its other end; and switching means selectively switched between a first position in which the other end of the condenser is connected with ground and both ends of the condenser are disconnected from the other ends of the heater and the auxiliary condenser and a second position in which the other end of the condenser is disconnected from ground and both ends of the condenser are connected with the other ends of the heater and the auxiliary condenser.

7. An electric power supply as recited in claim 6, wherein the switching means includes:

a first switch which connects and disconnects the other end of the condenser with ground, a second switch which connects and disconnects the one end of the condenser with the other end of the heater, and a third switch which connects and disconnects the other end of the condenser with the other end of the auxiliary heater.

8. An electric power supply as recited in claim 7, wherein the first switch is closed and the second and third switches are opened at the first position, and the first switch is opened and the second and the third switches are closed at the second position.

9. An electric power supply as recited in claim 8, wherein the battery is connected with the other end of the heater by a first cable in which the booster circuit and the second switch are interposed, the other end of the auxiliary heater is connected with ground by a second cable in which the first switch and the third switch are interposed, and a part of the first cable between the booster circuit and the second switch is connected with a part of the second cable between the first and third switches by the condenser.

\* \* \* \* \*